Figure 1:
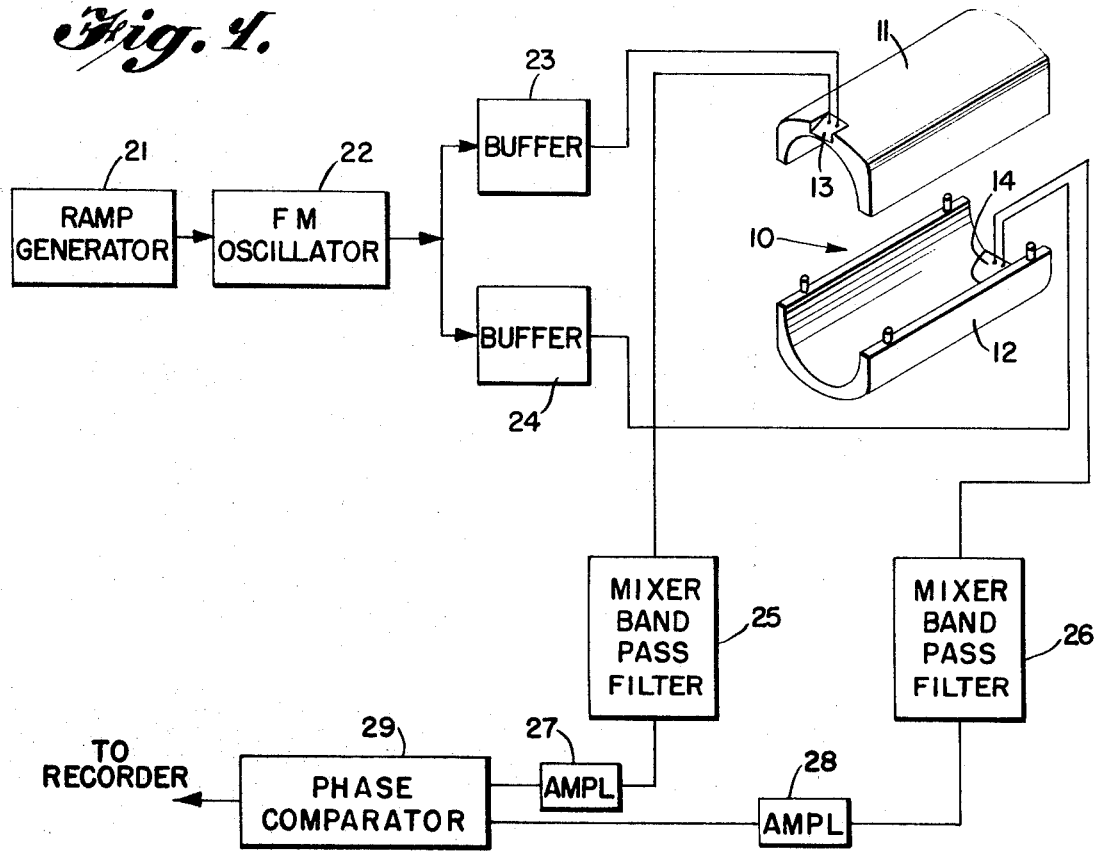

United States Patent

[11] 3,568,661

| [72] | Inventor | Dean L. Franklin<br>San Diego, Calif. |
|---|---|---|
| [21] | Appl. No. | 764,515 |
| [22] | Filed | Oct. 2, 1968 |
| [45] | Patented | Mar. 9, 1971 |
| [73] | Assignee | The United States of America as represented by the Secretary of the Department of Health Education and Welfare |

[54] FREQUENCY MODULATED ULTRASOUND TECHNIQUE FOR MEASUREMENT OF FLUID VELOCITY
6 Claims, 2 Drawing Figs.

[52] U.S. Cl. .................................................. 128/2.05, 73/67.6
[51] Int. Cl. .................................................. A61b 5/02
[50] Field of Search .................................. 128/2.05 (F), 2.05 (D), 24.05; 73/67.5—67.9, 194 (A)

[56] References Cited
UNITED STATES PATENTS

| 2,826,912 | 3/1958 | Kritz | 73/194 |
|---|---|---|---|
| 2,911,826 | 11/1959 | Kritz | 73/194 |
| 2,912,856 | 11/1959 | Kritz | 73/194 |
| 3,007,339 | 11/1961 | Hill | 73/194 |
| 3,020,759 | 2/1962 | Welkowitz | 73/194 |
| 3,430,625 | 3/1969 | McLeod, Jr. | 128/2.05 |
| 3,473,378 | 10/1969 | Yoshiyama et al. | 73/194 |

FOREIGN PATENTS

| 891,529 | 3/1962 | Great Britain | 73/194 |

OTHER REFERENCES

Noble, F. W., The Review of Scientific Instruments, Vol. 39, No. 9, Sept. 1968, PP. 1327—1331, (Copy in GR 280, 73/194)

Plass, K. G., IEEE Transactions on Biomedical Engr., Oct. 1964, PP 154—156, (Copy in GR. 335, 128/2.05)

*Primary Examiner*—Richard A. Gaudet
*Assistant Examiner*—Kyle L. Howell
*Attorney*—Karl W. Flocks

ABSTRACT: A device for measuring fluid velocity of the blood stream utilizing frequency modulated ultrasound transmitted through the moving blood with a composite signal detected, difference frequency signal extracted, phases across each of a pair of transducers compared, and the difference in phase being a measure of blood stream velocity.

INVENTOR
DEAN L. FRANKLIN

BY
ATTORNEY

FREQUENCY MODULATED ULTRASOUND TECHNIQUE FOR MEASUREMENT OF FLUID VELOCITY

The present invention relates to a method and device for measuring the velocity of the blood stream within a vein or artery without disturbing its flow and more particularly to the use of frequency modulated ultrasound for this purpose.

Accordingly, the present invention is directed to fluid velocity measurement adapted for use in physiological measurement system.

It is an object of the present invention to present a method and device for fluid velocity measurement in connection with physiological systems which are an improvement over prior art types of pulsed ultrasonic and phase-shift ultrasonic flowmeters. The system of the present invention can resolve small time differences which the pulsed systems are hard pressed to do, and possesses some immunity to reflected wave signals which plague the phase-shift systems.

Basically the present system measuring fluid velocity of the bloodstream involves attachment of a pair of transponders diagonally opposite each other on a blood vessel having them serve as both sound projector and sensor. The composite signal is detected and the beat note or difference frequency signal is extracted. The phase of the difference frequency signal appearing across one transducer is compared with the phase of the difference frequency signal across the other transducer. The difference in phase between these two signals is a measure of the velocity of the blood stream.

Figure 2:
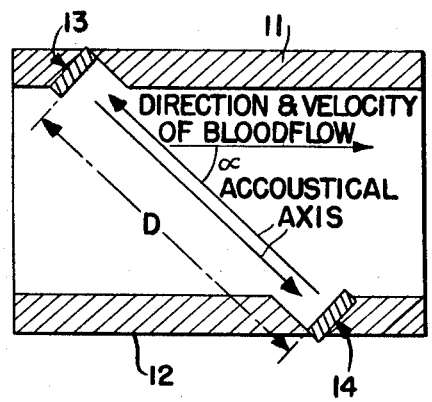

A complete understanding of the invention may be had from the following description of a particular embodiment of the invention. In the description, reference is made to the drawings in which:

FIG. 1 is a combined perspective and block diagram of the present system for measurement of blood stream velocity; and FIG. 2 is a section diagram of the transducer holder shown in perspective in FIG. 1.

In FIG. 1 there is shown in perspective a plastic cylindrical device 10 which has half portions 11 and 12 which may be placed around a surgically exposed blood vessel for blood velocity measurement. There is no need with this system to open the vascular system and therefore measurements are made with no interruption to blood flow merely by fitting portions 11 and 12 together over a blood vessel.

Mounted in opposite ends of plastic cylindrical device 10 in portions 11 and 12, respectively, are piezoelectric crystals 13 and 14 which in the present case may be of lead zirconate-titanate. Crystals 13 and 14 are placed so as to be in contact with the wall of the blood vessel and diagonally opposed as illustrated in FIG. 2 so as to couple sound from each to the other through the blood vessel.

As illustrated in block diagram form of FIG. 1, an electrical signal varying in frequency from approximately 9.5 MHz. to 10.5 MHz. is generated by modulating FM oscillator 22 with a repetitive voltage ramp generator 21. An example of a commercially available device which performs the functions of both the FM oscillator 22 and ramp generator 21 is a Hewlett-Packard Sweeping Signal Generator, Model 675-A. The output of the FM oscillator 22 is coupled to two identical buffer-power amplifiers 23 and 24. The outputs of buffer stages 23 and 24 are coupled to crystals 13 and 14, respectively. The resultant frequency modulated ultrasound is propagated simultaneously upstream and downstream through the blood to the opposing crystals 13 and 14.

The electrical signal appearing across each of crystals 13 and 14 is a composite of the driving signal voltage and the acoustical signal arriving from the opposite crystal of millivolt value. These two signals differ in frequency by an amount proportional to the transit time of the sound traveling between the two crystals. The difference frequency signal in each case is extracted by detecting, mixing, and band-pass filtering in mixer-band-pass filters 25 and 26 connected to crystals 13 and 14, respectively. Multiple transit signals will occur at all harmonics of the difference frequency signal. These multiple transit signals are eliminated by the band-pass filter sections of mixer-band-pass filters 25 and 26. The outputs of filters 25 and 26 are amplified through amplifiers 27 and 28, respectively, and coupled to a phase comparator 29. A voltage is developed in phase comparator 29 which is proportional to the difference in phase between the upstream signal and the downstream signal. This voltage is recorded and calibrated in terms of velocity.

The difference in frequency between the upstream and downstream detected signals can be computed as follows with practical calculations and the configuration shown in FIG. 2, symbols defined as follows:

$\Delta f_u$ = upstream difference frequency of composite driving signal and acoustical signal at crystal 13 arriving from opposite crystal 14;

$\Delta f_d$ = downstream difference frequency of composite driving signal and acoustical signal at crystal 14 arriving from opposite crystal 13;

$t_u$ = upstream transit time $t_d$ = downstream transit time

D = distance between crystals 13 and 14 measured along the acoustical axes

V = velocity of the medium

C = velocity of sound in a still medium $\alpha$ = angle between flow and acoustical axes $dt$ = difference in transit axis time The formula for difference in frequency is as follows:

$$\Delta f_u - \Delta f_d = (df/dt)(t_u - t_d)$$

where practically for blood flow measurements $df/dt = 10^9$ cps/sec.

$t_u - t_d = 10^{-8}$ sec. (max)

D = 3 cm.

V = 100 cm./sec. (max)

$C = 1.5 (10)^5$ cm./sec.

$\alpha = 45°$

From the above, the maximum difference in frequency will be approximately 10 cycles per second. This expressed in terms of phase relationship, is approximately 4° for a 10 nanosecond difference in upstream-downstream transit time. This phase shift is easily observable and measurable, and has been tested as feasible using a transducer with only a 1 cm. crystal separation.

The general instrumentation technique is applicable to measurement of the velocity of an energy propagating medium where energy can be propagated simultaneously upstream and downstream across the propagating medium such as applications to ocean current meters and gas velocity meters where energy would be propagated in the form of frequency modulated ultrasound. Another conceivable application would be in inertial guidance systems where the phase shift of frequency modulated light would be measured.

It will also be obvious to those skilled in the art that various changes may be made without departing from the scope of the invention and the invention is not to be considered limited to what is shown in the drawings and described in the specification.

I claim:

1. An ultrasonic apparatus for measurement of fluid flow especially of the blood stream through a blood vessel comprising:

a repetitive voltage ramp generator;

a frequency modulated oscillator connected to and modulated by said ramp generator;

first and second buffer stages coupled to said frequency modulated oscillator;

first and second transducers spaced apart upstream and downstream of the fluid flow and defining a transmission path for ultrasonic waves therebetween through said fluid, said first and second transducers connected respectively to said first and second buffer stages;

detection, mixing and band-pass filtering means connected to each of said first and second transducers;

amplifying means connected to each of said filtering means;

a phase comparator connected for comparison of outputs from each of said amplifying means; and indicating means connected to said phase comparator and responsive to the difference of the outputs from each of said amplifying means.

2. The ultrasonic apparatus of claim 1 further characterized by:

a mounting means for holding said first and second transducers in a spaced apart relationship including:

a pair of fitted longitudinal portions of a substantially cylindrical form; and said first transducer mounted on one of said longitudinal portions and said second transducer mounted on the other of said longitudinal portions, said first and second transducers spaced diagonally across from each other when said pair of longitudinal portions are in position fitted to each other.

3. The ultrasonic apparatus of claim 2 further characterized by:

said longitudinal portions shaped and adapted for fitting around a blood vessel surgically exposed; and said transducers adapted to be positioned against and on opposite sides of the blood vessel.

4. The ultrasonic apparatus of claim 1 wherein said transducers include crystals of lead zirconate-titanate.

5. A method of measuring the velocity of fluid flow in a blood vessel which comprises:

surgically exposing a blood vessel;

mounting a pair of crystal transducers spaced apart upstream and downstream of the fluid flow and defining a transmission path for ultrasonic waves therebetween through said fluid, with the crystals of said transducers in contact with the wall of the blood vessel;

generating an electric signal by modulating a frequency modulated oscillator with a repetitive voltage ramp which is then fed to each of said transducers;

detecting, mixing, and filtering the signal from each of said transducers and combining the signals from each of said transducers for phase comparison; and calibrating and indicating the phase difference in terms of velocity of the fluid flow in the blood vessel.

6. The method of claim 5 further characterized by mounting said pair of transducers by clamping them to the blood vessel in diagonally opposite positions against opposite sides of the blood vessel.